United States Patent
Cionca et al.

(10) Patent No.: US 9,600,543 B1
(45) Date of Patent: Mar. 21, 2017

(54) QUERY-BASED STREAM

(71) Applicant: Google Inc., Mountain View, CA (US)

(72) Inventors: Lucian Florin Cionca, Santa Clara, CA (US); Andre Rohe, Mountain View, CA (US); Yonatan Zunger, Mountain View, CA (US); Sangsoo Sung, Palo Alto, CA (US); Mohit Oberoi, Campbell, CA (US); Daniel Belov, San Francisco, CA (US); Harish Rajamani, Sunnyvale, CA (US); Jinan Lou, Cupertino, CA (US)

(73) Assignee: GOOGLE INC., Mountain View, CA (US)

( * ) Notice: Subject to any disclaimer, the term of this patent is extended or adjusted under 35 U.S.C. 154(b) by 528 days.

(21) Appl. No.: 14/040,466

(22) Filed: Sep. 27, 2013

Related U.S. Application Data

(60) Provisional application No. 61/707,871, filed on Sep. 28, 2012, provisional application No. 61/707,867, filed on Sep. 28, 2012.

(51) Int. Cl.
*G06F 17/30* (2006.01)
*G06Q 50/10* (2012.01)

(52) U.S. Cl.
CPC .. *G06F 17/30554* (2013.01); *G06F 17/30867* (2013.01); *G06Q 50/10* (2013.01)

(58) Field of Classification Search
CPC .... H04L 67/22; G06F 17/30867; G06Q 50/10
See application file for complete search history.

(56) References Cited

U.S. PATENT DOCUMENTS

| | | | | |
|---|---|---|---|---|
| 2011/0153423 | A1* | 6/2011 | Elvekrog | G06Q 30/02 705/14.53 |
| 2011/0154223 | A1* | 6/2011 | Whitnah | G06Q 10/10 715/753 |
| 2011/0225518 | A1* | 9/2011 | Goldman | G06F 3/04815 715/757 |
| 2013/0124538 | A1* | 5/2013 | Lee | G06F 17/3053 707/749 |
| 2013/0139048 | A1* | 5/2013 | Dhawan | G06Q 30/0278 715/234 |
| 2013/0304822 | A1* | 11/2013 | Tetreault | H04N 21/2187 709/204 |
| 2014/0136441 | A1* | 5/2014 | Agarwalla | G06Q 30/0241 705/344 |
| 2014/0337317 | A1* | 11/2014 | Woss | G06F 17/30867 707/722 |

* cited by examiner

*Primary Examiner* — Mohammad S Rostami
(74) *Attorney, Agent, or Firm* — McDermott Will & Emery LLP

(57) ABSTRACT

In one aspect, a method includes receiving an indication of a request from a user to view a stream associated with the user, generating a request for one or more items visible to the user for display within the stream, the request including a search query identifying search criteria including one or more tokens, the one or more tokens including at least a user token identifying the user, receiving one or more items in response to the request, the one or more items including at least one of the one or more tokens and further being visible to the user and providing the one or more items for display to the user within the stream in response to the request. Other aspects can be embodied in corresponding systems and apparatus, including computer program products.

20 Claims, 8 Drawing Sheets

QUERY-BASED STREAM

CROSS-REFERENCE TO RELATED APPLICATION

The present application claims the benefit of U.S. Provisional Patent Application Ser. No. 61/707,871, entitled "Query-Based Stream," filed on Sep. 28, 2012 and claims the benefit of U.S. Provisional Patent Application Ser. No. 61/707,867, entitled "Retrieval Tokens for Generating a Query-Based Stream," filed on Sep. 28, 2012 which are hereby incorporated by reference in their entirety for all purposes.

BACKGROUND

Social networking services provide users with a set of items for viewing as part of the social networking experience of the user. The items may include items generated by other users, and shared with the user. Such items may include private items as well as public items owned by contacts of the user and shared with the user.

One approach for generating a user social stream is facilitated according to the push model. The push model method for generating the listing of items displayed to the user may include detecting an item shared with the user, and/or of interest to the user, and adding the item to a user cache specific to the user. Once the user logs into the social networking service, the system accesses the user cache of the user and displays the items stored in the user cache to the user within a social stream.

While this solution provides the user with a comprehensive list of all items visible to the user, having to store each item separately for each user requires a large amount of memory for maintaining a user cache per user. Furthermore, because the storage is ongoing as items become available, the user cache has to be populated for all users regardless of the frequency that the user visits the social networking service.

SUMMARY

The disclosed subject matter relates to a machine-implemented method including receiving an indication of a request from a user to view a stream associated with the user. The method may further include generating a request for one or more items visible to the user for display within the stream, the request comprising a search query identifying search criteria including one or more tokens, the one or more tokens including at least a user token identifying the user. The method may further include receiving one or more items in response to the request, the one or more items including at least one of the one or more tokens and further being visible to the user. The method may further include providing the one or more items for display to the user within the stream in response to the request. Other aspects can be embodied in corresponding systems and apparatus, including computer program products.

These and other aspects can include one or more of the following features. The method may further include determining that the stream should be updated. The method may further include sending an update request comprising a update search query, the update search query including the search criteria of the search query and further comprising a time restriction, wherein the time restriction indicates one of a time when the one or more items were received in response to the search request or a time when one or more items were received in response to an update search query. The method may further include receiving one or more additional items in response to the update search request and providing the one or more additional items for display within the stream in addition to the one or more items.

The one or more tokens may include at least one owner token, the owner token identifying a second user associated with the first user. The one or more tokens may include a super doc token, the super doc token identifying a type of item that is owned by a super followee, wherein a user is identified as a super followee if the item is visible to a number of users that meets a threshold, wherein the super doc token is associated with a set of filter criteria.

The method may further include determining that the user is no longer viewing the stream and storing identifiers of the items displayed within the stream within a list of items. The method may further include identifying the one or more items from a plurality of items, the plurality of items comprising items generated by one or more users and wherein each of the plurality of items is associated with one or more tokens.

The identifying may include identifying a set of items of the plurality of items having tokens matching at least one of the one or more tokens, the set of items including one or more items and determining that the one or more items of the set of items are visible to the user.

The method may further include sorting the one or more items and providing the one or more items according to the sorting. The sorting may include determining a quality score for each of the one or more items, the quality score being based on quality criteria, wherein the quality criteria includes item popularity, item freshness, and affinity of the user and the owner of the item and sorting the one or more items according to a quality score associated with each of the one or more items. The sorting may include diversifying the one or more items according to one or more diversification criteria. The sorting may include identifying a list of items previously displayed to a user in a stream, the list comprising identifiers for each of one or more previously displayed items, identifying the one or more of the one or more items that have identifiers listed in the list of items and moving the identified one or more of the one or more items below the one or more items, such that the one or more of the one or more items are sorted further from the top with to the other items of the one or more items.

The query may include end user credentials associated with the user and wherein an item is visible to the user if the item can be decrypted using end user credentials associated with the user.

The disclosed subject matter also relates to a system including one or more processors and a machine-readable medium including instructions stored therein, which when executed by the processors, cause the processors to perform operations including receiving a query to provide one or more items for display to a user within a stream, the query identifying search criteria including one or more tokens, the one or more tokens including at least a user token identifying the user. The operations may further include identifying a set of items including one or more items from a plurality of items having tokens matching at least one of the one or more tokens, the plurality of items comprising items generated by one or more users and wherein each of the plurality of items is associated with one or more tokens. The operations may further include determining one or more items of the set of items visible to the user, wherein an item is determined to be visible to a user when the user is authorized to view the item. The operations may further include sorting the one or more items. The operations may further include providing the one or more items according to the sorting in response to the query. Other aspects can be embodied in corresponding systems and apparatus, including computer program products.

These and other aspects can include one or more of the following features. The query may include end user credentials associated with the user and wherein a user is authorized to view the item if the item can be decrypted using end user credentials associated with the user.

The sorting may include determining a quality score for each of the one or more items, the quality score being based on quality criteria, wherein the quality criteria includes one or more of item popularity, item freshness, and affinity of the user and the owner of the item and sorting the one or more items according to the quality score associated with each of the one or more items. The sorting may include diversifying the one or more items according to one or more diversification criteria. The sorting may include identifying a list of items previously displayed to a user in a stream, the list comprising identifiers for each of one or more previously displayed items, identifying the one or more of the one or more items that have identifiers listed in the list of items and moving the identified one or more of the one or more items below the one or more items, such that the one or more of the one or more items are sorted further from the top with to the other items of the one or more items.

The one or more tokens may include one or more of a user token identifying the user or an owner token identifying the owner of an item. The one or more tokens may include a super doc token identifying an item having an owner that has a number of followers higher than a threshold, where the superdoc token is associated with one or more filter criteria, wherein the identifying a set of items including one or more items from a plurality of items comprises identifying items that include a super doc token and further match the filter criteria.

The disclosed subject matter relates to a machine-readable medium comprising instructions stored therein, which when executed by a machine, cause the machine to perform operations including receiving an indication of a request from a user to view a stream associated with the user. The operations may further include determining one or more tokens corresponding to the request, the one or more tokens including at least a user token identifying the user. The operations may further include identifying a set of items including one or more items from a plurality of items having tokens matching at least one of the one or more tokens, the plurality of items comprising items generated by one or more users and wherein each of the plurality of items is associated with one or more tokens. The operations may further include determining one or more items of the set of items visible to the user, wherein an item is determined to be visible to a user when the user is authorized to view the item. The operations may further include providing the one or more items of the set of items for display to a user in response to the request.

The disclosed subject matter relates to a machine-implemented method including identifying a user associated with a request to provide one or more posts. The method further including identifying a user token associated with the user. The method further including identifying one or more contacts associated with the user. The method further including identifying one or more owner tokens associated with one or more contacts of the user and generating a query to retrieve one or more posts in response to the request, the query including one or more tokens, the one or more tokens including the identified user token. Other aspects can be embodied in corresponding systems and apparatus, including computer program products.

These and other aspects can include one or more of the following features. The method may further include determining if the one or more contacts include one or more fresh contacts and identifying one or more owner tokens, including an owner token associated with each of the one or more fresh contacts when the one or more contacts include one or more fresh contacts, where the one or more tokens further include the one or more owner tokens associated with the one or more fresh contacts.

The method may further include determining if the one or more contacts include one or more super followees. The method may further include determining if the number of super followees associated with the user meets a predefined threshold when the one or more contacts include one or more super followees and identifying one or more owner tokens associated with the one or more super followees including an owner token for each of the one or more super followees associated with the user when the number of super followees associated with the user does not meet the predefined threshold where the one or more tokens further include the one or more owner tokens associated with the one or more super followees.

The method may further include selecting a number of the super followees up to the threshold when the number of super followees associated with the user meets the predefined threshold and identifying one or more owner tokens associated with the selected super followees including an owner token for each of the selected one or more super followees, where the one or more tokens included in the query include the identified one or more tokens associated with the selected super followees.

The disclosed subject matter relates to a system including one or more processors and a machine-readable medium including instructions stored therein, which when executed by the processors, cause the processors to perform operations including identifying a user associated with a request to provide one or more posts. The operations further including identifying a user token associated with the user. The operations further including identifying one or more contacts associated with the user. The operations further including identifying one or more owner tokens associated with one or more contacts of the user. The operations further including generating a query to retrieve one or more posts in response to the request, the query including one or more tokens, the one or more tokens including the identified user token and identifying one or more posts in response to the query, the one or more posts including at least one of the one or more tokens. Other aspects can be embodied in corresponding systems and apparatus, including computer program products.

The disclosed subject matter relates to a machine-readable medium including instructions stored therein, which when executed by a machine, cause the machine to perform operations including identifying a user token associated with a user. The operations further including identifying one or more contacts associated with the user. The operations further including identifying one or more owner tokens associated with one or more contacts of the user. The operations further including generating a query, the query including one or more tokens, the one or more tokens including the identified user token and identifying one or more posts in response to the query, the one or more posts including at least one of the one or more tokens. Other aspects can be embodied in corresponding systems and apparatus, including computer program products.

The disclosed subject matter relates to a machine-implemented method including identifying a user associated with a request to generate a stream associated with the user. The method further including identifying a user token associated with the user. The method further including identifying one or more contacts associated with the user. The method further including determining if the one or more contacts include one or more fresh contacts. The method further including identifying one or more owner tokens associated with each of the one or more fresh contacts associated with the user when the one or more contacts include one or more fresh contacts. The method further including determining if the one or more contacts include one or more super followees. The method further including determining if the number of super followees associated with the user meets a predefined threshold when the one or more contacts include one or more super followees. The method further including identifying one or more owner tokens associated with the one or more super followees including an owner token for each of the one or more super followees associated with the user when the number of super followees associated with the user do not meet the predefined threshold and generating a query including one or more tokens, the one or more tokens including the identified user token.

Other aspects can be embodied in corresponding systems and apparatus, including computer program products.

These and other aspects can include one or more of the following features. The one or more tokens included in the query may further include the one or more tokens associated with the one or more super followees when the number of super followees associated with the user do not meet the predefined threshold. The method may further include selecting a number of the super followees up to the threshold when the number of super followees associated with the user meets the predefined threshold and identify one or more owner tokens associated with the selected super followees including an owner token for each of the selected one or more super followees, where the one or more tokens included in the query include the identified one or more tokens associated with the selected super followees.

The method may further include determining identifiers for each of the one or more super followees of the one or more contacts when the number of super followees associated with the user meets the predefined threshold and identifying a super doc token including the identifiers as filter criteria. The one or more tokens included in the query may further include the super doc token and the filter criteria. The super doc token may identify posts that are owned by a user that is a super followee.

A contact may be a super followee if the contact has generated one or more posts shared with a predefined number of users of the social networking service. A contact is a fresh contact if the contact has been associated with the user within a predefined period of time. The user token may identify one or more stored posts shared with the user. Each owner token may identify one or more stored posts owned by the contact associated with the owner token.

The method may further include sending the query to retrieve posts relating to the user for display within the social stream. The method may further include receiving an indication of a request from the user to view a social stream associated with the user, at a social networking service and generating the query in response to the request, the query including search criteria including the one or more tokens. The method may further include receiving one or more posts in response to the request, the one or more posts including at least one of the one or more tokens included in the query and further being visible to the user and providing the one or more posts for display to the user within the social stream at the social networking service in response to the request.

The disclosed subject matter relates to a system including one or more processors and a machine-readable medium including instructions stored therein, which when executed by the processors, cause the processors to perform operations including identifying a user associated with a request to provide one or more posts. The operations further including identifying a user token associated with the user. The operations further including identifying one or more contacts associated with the user. The operations further including identifying one or more owner tokens associated with one or more contacts of the user. The operations further including generating a query to retrieve one or more posts in response to the request, the query including one or more tokens, the one or more tokens including the identified user token and identifying one or more posts in response to the query, the one or more posts including at least one of the one or more tokens. Other aspects can be embodied in corresponding systems and apparatus, including computer program products.

The disclosed subject matter relates to a machine-readable medium including instructions stored therein, which when executed by a machine, cause the machine to perform operations including identifying a user. The operations further including identifying a user token associated with a user. The operations further including identifying one or more contacts associated with the user. The operations further including determining if the one or more contacts include one or more fresh contacts. The operations further including identifying one or more owner tokens associated with each of the one or more fresh contacts associated with the user when the one or more contacts include one or more fresh contacts. The operations further including determining if the one or more contacts include one or more super followees. The operations further including determining if the number of super followees associated with the user meets a predefined threshold when the one or more contact include one or more super followees. The operations further including identifying one or more owner tokens associated with the one or more super followees associated with the user when the number of super followees associated with the user does not exceed a predefined value. The operations further including sending a query including one or more tokens, the one or more tokens including the identified user token and one or more owner tokens, the one or more owner tokens including the one or more tokens associated with the one or more followees when the number of super followees associated with the user does not exceed the predefined value. The operations further including receiving a set of posts in response to the query, the set of post including at least one of the one or more tokens. Other aspects can be embodied in corresponding systems and apparatus, including computer program products.

The disclosed subject matter relates to a method including receiving an indication of a post being generated by a user. The method further including associating an owner token identifying the user with the post. The method further including identifying one or more users that the post is shared with by the user. The method further including associating one or more user tokens with the post and storing the post along with one or more tokens associated with the post. Other aspects can be embodied in corresponding systems and apparatus, including computer program products.

These and other aspects can include one or more of the following features. The method may further include determining if the number of one or more users meets a threshold, where the one or more user tokens include a user token for each of the one or more users when the number of one or more users does not meet the threshold.

The method may further include selecting a number of the one or users, the number of one or more users being equal to a threshold number when the number of one or more users meets the threshold and where the one or more user tokens include a user token for each of the one or more selected users. The method may further include identifying the user as an owner of the post.

The disclosed subject matter relates to a system including one or more processors and a machine-readable medium including instructions stored therein, which when executed by the processors, cause the processors to perform operations including receiving an indication of a post being generated by a user The operations further including identifying the user as an owner of the post. The operations further including associating an owner token identifying the user with the post. The operations further including identifying one or more users that the post is shared with by the user. The operations further including determining if the number of one or more users meets a threshold. The operations further including associating one or more user tokens with the post, where the one or more user tokens include a user token for each of the one or more users when the number of one or more users does not meets the threshold and storing the post along with one or more tokens associated with the post. Other aspects can be embodied in corresponding systems and apparatus, including computer program products.

These and other aspects can include one or more of the following features. The operations may further include selecting a number of the one or users, the number of one or more users being equal to a threshold number when the number of one or more users meets the threshold and associating a user token for each of the one or more selected users with the post.

The operations may further include determining that the user is a super followee when the number of one or more users meets the threshold and storing an indication that the user is a super followee in association with the user when the user is a super followee. The operations may further include associating a super doc token with the post when the number of one or more users meets the threshold.

Storing the post may include parsing the post to extract one or more post elements, the one or more post elements including one or more of a post content, post title or one or more post topics and storing the one or more post elements and the one or more tokens associated with the post within a search index in association with the post.

The disclosed subject matter relates to a machine-readable medium including instructions stored therein, which when executed by a machine, cause the machine to perform operations including receiving an indication of a post being generated by a user. The operations further including identifying the user as an owner of the post. The operations further including associating an owner token identifying the user with the post. The operations further including identifying one or more users that the post is shared with by the user. The operations further including determining if the number of one or more users meets a threshold. The operations further including associating one or more user tokens with the post, where the one or more user tokens include a user token for each of the one or more users when the number of one or more users does not meets the threshold and storing the post along with one or more tokens associated with the post.

These and other aspects described throughout the specification provide various advantages including, but not limited to, facilitating easy retrieval of posts at the time of retrieval for display to the user using the retrieval tokens associated with each post stored in the search index.

The disclosed subject matter relates to a machine-implemented method including receiving an indication of a request from a user to view a stream associated with the user. The method further including generating a request for one or more posts visible to the user, for display within the stream, the request including a search query identifying search criteria including one or more tokens, the one or more tokens including at least a user token identifying the user. The method further including receiving one or more posts in response to the request, the one or more posts including at least one of the one or more tokens and further being visible to the user. Other aspects can be embodied in corresponding systems and apparatus, including computer program products.

These and other aspects can include one or more of the following features. The method may further include providing the one or more posts for display to the user within the stream in response to the request. The method may further include determining that the stream should be updated and sending an update request including a update search query, the update search query including the search criteria of the search query and further including a time restriction, where the time restriction indicates one of a time when the one or more posts were received in response to the search request or a time when one or more posts were received in response to an update search query. The method may further include receiving one or more additional posts in response to the update search request and providing the one or more additional posts for display within the stream in addition to the one or more posts.

The method may further include determining that the user is no longer viewing the stream and storing identifiers of the posts displayed within the stream within a list of posts. The one or more tokens may further include at least one owner token, the owner token identifying a second user associated with the first user. The one or more tokens may further include a super doc token, the super doc token identifying a type of post that is owned by a super followee, where a user is identified as a super followee if the post is visible to a number of users that meets a threshold, where the super doc token is associated with a set of filter criteria.

The method may further include identifying the one or more posts from a plurality of posts, the plurality of posts including posts generated by one or more users and where each of the plurality of posts is associated with one or more tokens. The identifying may include identifying a set of posts of the plurality of posts having tokens matching at least one of the one or more tokens, the set of posts including one or more posts and determining that the one or more posts of the set of posts are visible to the user. The method may further include sorting the one or more posts and providing the one or more posts according to the sorting.

The sorting may include determining a quality score for each of the one or more posts, the quality score being based on quality criteria, where the quality criteria includes post popularity, post freshness, and affinity of the user and the owner of the post and sorting the one or more posts according to a quality score associated with each of the one or more posts. The query may further include end user credentials associated with the user and where a post is visible to the user if the post can be decrypted using end user credentials associated with the user.

The disclosed subject matter also relates to a system including one or more processors and a machine-readable medium including instructions stored therein, which when executed by the processors, cause the processors to perform operations including receiving an indication of a request from a user to view a stream associated with the user. The operations further including generating a request for one or more posts visible to the user for display within the stream, the request comprising a search query identifying search criteria including one or more tokens, the one or more tokens including at least a user token identifying the user. The operations further including receiving one or more posts in response to the request, the one or more posts including at least one of the one or more tokens and further being visible to the user and providing the one or more posts for display to the user within the stream in response to the request.

The disclosed subject matter relates to a machine-readable medium comprising instructions stored therein, which when executed by a machine, cause the machine to perform operations including receiving an indication of a request from a user. The operations further including generating a request for one or more posts visible to the user for display within the stream, the request comprising a search query identifying search criteria including one or more tokens, the one or more tokens including at least a user token identifying the user and receiving one or more posts in response to the request, the one or more posts including at least one of the one or more tokens and further being visible to the user.

The disclosed subject matter also relates to a machine-implemented method including receiving a query to provide one or more posts for display to a user, the query identifying search criteria including one or more tokens, the one or more tokens including at least a user token identifying the user. The method further including identifying a set of posts including one or more posts from a plurality of posts having tokens matching at least one of the one or more tokens, the plurality of posts comprising posts generated by one or more users and wherein each of the plurality of posts is associated with one or more tokens. The method further including determining one or more posts of the set of posts visible to the user, wherein a post is determined to be visible to a user when the user is authorized to view the post. The method further including providing the one or more posts of the set of posts in response to the query. Other aspects can be embodied in corresponding systems and apparatus, including computer program products.

These and other aspects can include one or more of the following features. The query may further include end user credentials associated with the user and wherein a user is authorized to view the post if the post can be decrypted using end user credentials associated with the user.

The method may further include sorting the one or more posts of the set of posts, wherein the providing comprises providing the one or more posts of the set of posts according to the sorting. The sorting may include determining a quality score for each of the one or more posts, the quality score being based on quality criteria, wherein the quality criteria includes one or more of post popularity, post freshness, and affinity of the user and the owner of the post and sorting the one or more posts according to the quality score associated with each of the one or more posts.

The sorting may include diversifying the one or more posts according to one or more diversification criteria. The sorting may include identifying a list of posts previously displayed to a user in a stream, the list comprising identifiers for each of one or more previously displayed posts, identifying the one or more of the one or more posts that have identifiers listed in the list of posts and moving the identified one or more of the one or more posts below the one or more posts, such that the one or more of the one or more posts are sorted further from the top with to the other posts of the one or more posts.

The one or more tokens may include one or more of a user token identifying the user or an owner token identifying the owner of a post. The one or more tokens may include a super doc token identifying a post having an owner that has a number of followers higher than a threshold and wherein the superdoc token is associated with one or more filter criteria, wherein the identifying a set of posts including one or more posts from a plurality of posts comprises identifying posts that include a super doc token and further match the filter criteria.

The disclosed subject matter also relates to a system including one or more processors and a machine-readable medium including instructions stored therein, which when executed by the processors, cause the processors to perform operations including receiving a query to provide one or more posts for display to a user within a stream, the query identifying search criteria including one or more tokens, the one or more tokens including at least a user token identifying the user. The operations further including identifying a set of posts including one or more posts from a plurality of posts having tokens matching at least one of the one or more tokens, the plurality of posts including posts generated by one or more users and where each of the plurality of posts is associated with one or more tokens and determining one or more posts of the set of posts visible to the user, where a post is determined to be visible to a user when the user is authorized to view the post. The operations further including sorting the one or more posts and providing the one or more posts according to the sorting in response to the query. Other aspects can be embodied in corresponding systems and apparatus, including computer program products.

These and other aspects can include one or more of the following features. The query may further include end user credentials associated with the user and where a user is authorized to view the post if the post can be decrypted using end user credentials associated with the user. The sorting may include determining a quality score for each of the one or more posts, the quality score being based on quality criteria, where the quality criteria includes one or more of post popularity, post freshness, and affinity of the user and the owner of the post and sorting the one or more posts according to the quality score associated with each of the one or more posts.

The sorting may include diversifying the one or more posts according to one or more diversification criteria. The sorting may include identifying a list of posts previously displayed to a user in a stream, the list including identifiers for each of one or more previously displayed posts, identifying the one or more of the one or more posts that have identifiers listed in the list of posts and moving the identified one or more of the one or more posts below the one or more posts, such that the one or more of the one or more posts are sorted further from the top with to the other posts of the one or more posts.

The one or more tokens may include one or more of a user token identifying the user or an owner token identifying the owner of a post. The one or more tokens may include a super doc token identifying a post having an owner that has a number of followers higher than a threshold, where the superdoc token is associated with one or more filter criteria, where the identifying a set of posts including one or more posts from a plurality of posts includes identifying posts that include a super doc token and further match the filter criteria.

The disclosed subject matter relates to a machine-readable medium comprising instructions stored therein, which when executed by a machine, cause the machine to perform operations including receiving a query identifying search criteria including one or more tokens, the one or more tokens including at least a user token identifying the user. The operations further including identifying a set of posts including one or more posts from a plurality of posts having tokens matching at least one of the one or more tokens, the plurality of posts comprising posts generated by one or more users and wherein each of the plurality of posts is associated with one or more tokens. The operations further including determining one or more posts of the set of posts visible to the user, wherein a post is determined to be visible to a user when the user is authorized to view the post. The operations further including providing the one or more posts of the set of posts for display to a user in response to the query.

The disclosed subject matter relates to a machine-implemented method including receiving an indication of a post being generated by a user. The method further including identifying the user as the owner of the post. The method further including determining one or more users the post is visible to the user. The method further including determining one or more tokens identifying the owner, and at least one of the one or more users and storing the post and the one or more tokens in a search index in association with the post. Other aspects can be embodied in corresponding systems and apparatus, including computer program products.

These and other aspects can include one or more of the following features. The method may further include parsing the post to extract one or more post elements, the one or more posts elements comprising one or more of a post content, post title or one or more post topics. The storing the post may further include storing the one or more post elements within a search index in association with the post. The method may further include determining if the post is a private post, wherein a post is a private post if it is shared with a specific group of people or identifier as private by the user. The storing the one or more post elements may further include encrypting the post content before storing the post content in the search index if the post is a private post. The he search index may include a first index for storing private posts and a second index for storing public posts. The method may further include storing the post in the first index, if the post is a private post and storing the post in the second index if the post is not a private post.

The disclosed subject matter also relates to a including one or more processors and a machine-readable medium comprising instructions stored therein, which when executed by the processors, cause the processors to perform operations including receiving an indication of a post being generated by a user. The operations further including identifying the user as the owner of the post. The operations further including determining one or more users the post is visible to and storing one or more tokens in the search index identifying the owner, and at least one of the one or more users along with the post in a search index. Other aspects can be embodied in corresponding systems and apparatus, including computer program products.

These and other aspects can include one or more of the following features. The operations may further include parsing the post to extract one or more post elements, the one or more posts elements comprising one or more of a post content, post title or one or more post topics, wherein the storing the post comprises storing the one or more post elements within a search index in association with the post.

The disclosed subject matter also relates to a machine-readable medium including instructions stored therein, which when executed by a machine, cause the machine to perform operations including receiving an indication of a post being generated by a user. The operations further including parsing the post to extract one or more post elements, the one or more posts elements including one or more of a post content, post title or one or more post topics. The operations further including storing the one or more post elements within a search index in association with the post. The operations further including identifying the user as the owner of the post. The operations further including determining one or more users the post is visible to and storing one or more tokens in the search index along with the one or more post elements identifying the owner, and at least one of the one or more users. Other aspects can be embodied in corresponding systems and apparatus, including computer program products.

These and other aspects can include one or more of the following features. The operations may further include determining if the post is a private post, where a post is a private post if it is shared with a specific group of people or identifier as private by the user. The storing the one or more post elements may include encrypting the post content before storing the post content in the search index if the post is a private post. The search index may include a first index for storing private posts and a second index for storing public posts. The operations may further include storing the post in the first index, if the post is a private post and storing the post in the second index if the post is not a private post.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
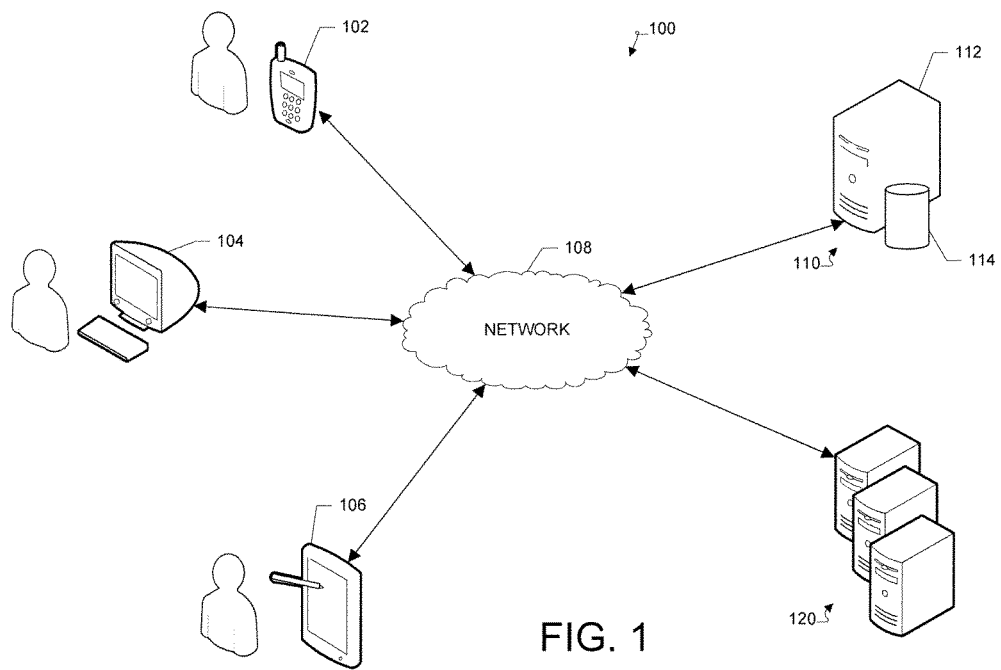
FIG. 1 illustrates an example client-server network environment, which provides for generating a query-based social stream for a user of a social networking service.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

The subject disclosure provides a system and method for generating a list of items for display to a user (e.g., within a stream of a social networking service) using a pull based or query-based model (hereinafter generally referred to as a "query-based model"). Items may include posts generated within a social networking service. Posts may include various media including texts, video, audio and/or one or more embedded links (e.g., to one or more other items, websites or other content). In one example, the list of items is generated using retrieval tokens embedded within the stored items.

The system receives items generated by users (e.g., generated at a social networking service) and generates one or more search indexes storing those items (e.g., a public item index, private item index or an index of all items generated). In one example, each item, upon being received, is parsed and stored as a collection of information relating to the item. The system may, for example, parse the item and extract one or more item elements including item content, item title and/or item topic(s). The system further identifies the item owner for each item (e.g., the item author or user who requested to generate the item). In one example, the system further identifies additional information regarding the item including whether the item is public or private (e.g., shared with all users, or a specific group of users) and/or whether the item is by a super followee (e.g., a user with a large number of followers). Additionally, in one example, the system identifies those users with whom the item is shared.

The system next stores the item elements at a search index. In one example, the system maintains a first search index for those items identified as private items, and another search index for public items. Based on whether an item is identified as public or private the item is stored in the correct index. The item elements may include the item content, item title and/or topic indicators (e.g., topic tags). In one example, with respect to certain items (e.g., private items) the items are encrypted before being stored within the search index and can be decrypted using a key. In one example, the key to decrypt the item content is accessible using end user credentials of a user authorized to view the item.

The system further stores one or more retrieval tokens (hereinafter generally referred to as "tokens") in association with the item. The tokens may include one or more ID-based tokens and/or other tokens. The ID-based tokens include user tokens (also referred to as "searcher tokens") representing one or more of the users with whom the item is shared or to whom the item is visible (e.g., contacts or followers of the item owner). A second ID-based token, known as an owner token, identifying the owner of the item, may also be stored along with the item.

The number of user tokens stored along with the item may depend on the threshold number of tokens that can be stored. Where the number of users that the item is shared with exceeds the threshold number (e.g., of all tokens or allowed number of user tokens), the system may determine that the item owner is a super followee. In one example, where the system determines that the owner of the item is a super followee (e.g., based on the number of user tokens or based on information regarding the owner), in addition to the owner token, the system may further store a non-ID-based token known as the "super doc token" along with the item, indicating that the item is owned by a super followee.

When the system receives an indication of user request to view one or more items (e.g., within his or her stream at a social networking service), a query is generated and sent, for example, to the backend search engine. The backend search engine has access to the one or more search indexes storing items generated by users of the social networking service. The query includes information regarding the user, the user's friends and/or the users/entities that the user is following. The information regarding the user includes a user token identifying the user and end user credentials of the user (e.g., SID cookie of the user at the browser) for accessing items (e.g., the ender user credential is used to decrypt encrypted items). The information regarding the user may also include various other information including user preferences (e.g., topics of interest to the user), user settings, and other similar information that may be helpful in retrieving items for display to the user.

In one example, the query further includes one or more other tokens. In one example, the system may perform a check to determine if the user has any fresh contacts. Fresh contacts are determined as those contacts that have been associated with the user within a pre-defined amount of time (e.g., 10 days). If the system identifies that the user has added new contacts within the predefined period of time, an owner token associated with each of the fresh contacts is determined and included within the query.

As described above, each item, when generated, will include user tokens for users the item is visible to (and/or an owner token, when the number of user tokens exceeds a threshold). When a new connection is made, previous items generated by a contact may become visible to the user, in which case a request is sent to the search index to update previous items to include a user token of the user (or to include an owner token and/or super doc token, if the number of users exceeds the threshold). However, the updating may not occur immediately, thus a grace period of time is allowed to update the search index. Including the owner token for fresh contacts allows items authored by a contact of the user to be retrieved even where the search index has not yet been updated to add the user token to items owned by the fresh contacts (e.g., for items visible to the user). Furthermore, where the system determines that the user is following one or more super followees, the query may include owner tokens associated with the super followees being followed by the user. A user may be identified as a super follower if the user follows a large number of super followees (e.g., a number of super followees that exceeds a threshold number).

The number of tokens (and/or owner tokens) included within the query may be limited to a threshold number, for various reasons including efficiency. In one example, if the number of tokens included within the query exceed the threshold number (e.g., the user is a super follower and/or has a large number of recent friends), one or more owner tokens for super followees may be omitted from the request, and instead, a super doc token may be included with the query.

The super doc token, as described above, is appended to all items owned by a super followee at the time of storage. Thus, the super doc token will match all items owned by a super followee. To customize the super doc token to return items associated with the super followees followed by the user, the super doc token is associated with a set of filter criteria. The filter criteria consist of the identifiers ("IDs") for the super followees associated with the user. In another example, the filter criteria may consist of IDs for those super followees for whom the owner token is not included within the query.

The search engine accesses the search index storing items generated by users of the social networking service, and retrieves items matching the query (e.g., including a user token, an owner token and/or a super doc token and matching the filter criteria). In one example, the system searches for any item including a token matching at least one token included within the query. In one example, the system identifies items authored by contacts of the user (e.g., according to the list of contacts provided with the query) as well as other users the user is following (e.g., according to the list of entity provided with the query). In the case of items including the super doc token, an item is retrieved if it includes a super doc token and meets the filter criteria associated with the super doc token of the query.

For each retrieved item, the system determines if the item is visible to the user (i.e., if the user's end user credential decrypt the item and/or the item is public). In one example, the system determines if the end user credentials of the user (e.g., included within the query) decrypt the encrypted item. This is a precautionary measure taken to ensure privacy changes with respect to an item are taken into account and kept up to date. In one example, the determination may only be necessary for items (e.g., private items) encrypted at the time of storage.

The items visible to the user and thus available to be provided for display to the user may be sorted according to several quality criteria including the popularity of each item, the affinity of the user to the author of each item and the freshness of each item. In one instance, the system calculates a quality score for each item based on the quality criteria, and the items are sorted according to the quality score for each item.

In one example, affinity information for each contact of the user is provided as part of the query sent with the search request and/or otherwise accessible (e.g., stored within a user profile at a storage). The affinity information may provide an indication of the degree of closeness between the user and an item owner (e.g., a contact of the user and/or other users the user is following). The affinity score may be determined based on activity between the user and the item owner at the social networking service and/or activity between the user and the contact at one or more other services (e.g., email, chat, document sharing services, etc.). The affinity score may be based on historical activity between the user and the item owner at the social networking service and/or one or more outside services. In one example, the affinity information may include two scores, with a first score indicating the user/contact affinity at the social networking service and a second score indicating the user/contact affinity outside the social networking service. In one example, the affinity information may be a single aggregate score of both affinity at the social networking service and affinity at outside services.

In addition to considering the affinity between the user and the item owner, the affinity element of the quality score of an item may be further based on the affinity of the user with other users (e.g., contacts and/or other users) which have performed an action with respect to the item (e.g., viewed the item, commented on the item, shared the item, endorsed the item).

Popularity of an item provides an indication of the amount of activity performed by one or more users of the social networking service with respect to the item. Actions may include views, comments, shares, endorsements (e.g., like, +1), and other similar actions taken toward an item. In one example, popularity of an item is determined in relation to time. That is, in one example, the popularity of an item is determined based on the number of actions that have been performed with respect to the item in relation to how long the item has been available, thus allowing for comparison of newer items against older items. In one example, the system may predict the popularity of an item over a period of time (e.g., based on the number of actions performed with respect to the item over the time the item has been available for viewing).

Freshness refers to the difference between the time the item was generated, updated and/or available for viewing (e.g., by the user or one or more other users) and the current time (e.g., at the time of the query). In addition to affinity, popularity and freshness, other criteria may also be taken into account for determining a quality score with respect to the item.

In one example, because sorting based on quality of items may result in a non-chronological sorting of the items, a user may become confused as to the reason items are presented in a certain order. That is, most users expect items to be displayed within a social stream according to time. To alleviate the non-chronological nature of the ranking, the system may determine if the ordering of items as sorted according to the quality criteria is not in balance with the chronological ordering of the items. In one example, a score threshold and time threshold is determined. Where two items do not meet the time and/or score threshold (e.g., not close in time and/or score), the ordering of the items based on their quality score is preserved. However, where two items do meet the score and time threshold (e.g., the difference in score of the two items is smaller than the threshold and they are close enough in time), the items are reordered according to their chronological order.

After the retrieved items have been sorted, the system may diversify the listing. Diversification is a process for ensuring that too many items having the same features (e.g., same author, same topic, same medium type, same group of users, etc.) are not presented to the user in one batch or at the top of the list. Various methods may be employed to diversify the items. As a result of diversification the sorted list is resorted to provide a more diversified ordering of items. Other actions may also be performed with respect to the sorted list and/or the diversified list.

In one example, the items may be reordered to maintain predictability for the user. As a social stream is provided for display to the user and a user views an item, the system keeps track of those items already viewed by the user. In one example, a user cache is maintained with item identifiers (ID) for each item provided to the user. Additionally, the system may detect when the user has actually viewed and/or read an item provided to the user (e.g., through detecting user scrolling, time spent on a page, clicking on an item, performing an action with respect to the item or other techniques for detecting and/or approximating user viewing and/or reading an item). The information regarding whether the user read/viewed the item may be stored within the user cache. In another example, an identifier of items viewed and/or read by the user are stored within the cache. In one example, the user cache is maintained for a short period of time (e.g., one or two weeks) before it is cleared. This ensures that the small amount of memory taken up by the item IDs stored within the cache is not wasted if the user is inactive for a long period of time such that the predictability provided through this technique is not beneficial or noticeable to the user.

Once the sorted list (according to the quality criteria or diversification) is ready, the system may access the user cache storing information regarding items previously presented to the user and/or viewed/read by the user. The items having been previously presented to the user, viewed by the user and/or read by the user may then be pushed down the stream. This provides the user with some predictability as the user is likely to recognize that he/she has reached a location within the list of items that include items previously presented to the user. In this way, items not previously presented to the user are likely to be presented on top of the list such that the user is likely to pay closer attention to these items.

Once the sorting according to the various methods described above is completed, one or more items are selected and provided for display to the user. In one example, all retrieved items may be provided for display to the user. In another example, a specific number of items (e.g., highest ranked items) are selected and provided for display to the user. In one example the items are displayed to the user according to the sorting.

Once the initial list or stream of items is provided for display to the user in response to the query, the system may update the list of items as new items are generated. The system may generate and/or send new queries (e.g., periodically) to the backend search engine to retrieve new items stored at the search index since the time the original items were provided for display and/or since the last update. The query may include all or some of the information included within the original query and may further include a time field, storing the time of the last update. In one example the system updates the list of items by storing a binary large object (blob) at the browser for issuing further queries. The blob includes the one or more tokens, user information, affinity information and/or contact information included within the original query, as well as a time element which reflects the time at which the original list of items was generated and/or provided for display to the user, or the last time the list was updated with new items.

In one example, new requests are issued (e.g., on a periodic basis) using the information stored in the blob and items generated and/or stored since the time t and meeting the query (e.g., meeting the same criteria as described above) are returned to be display in the list or stream of the user. In one example, the retrieved items may be sorted according to one or more of the techniques described above with respect to the original list. In this manner, the items presented for display to the user remains up to date for the duration that the user is viewing the stream and/or logged into the social networking service.

In one example, similar to update queries, the original query may similarly include a time element t, showing the last time a stream of items was displayed to the user. As described above, a user cache may be maintained for a user with item IDs of items previously presented to the user. The system may take advantage of the cache and only request items generated, updated and/or stored after the time of the last update to the cache. In one example, the items with item IDs within the cache are then retrieved and presented along with items provided in response to the query. In one example, the time element t may only be included for queries issued where the user has logged into the service within a specific period of time such that information regarding previously presented items are available (e.g., before the cache is cleared).

Users of social networking services may create associations with one another. The phrase "social networking service" as used herein encompasses its plain and ordinary meaning, including, but not limited to, an online service, platform or site that focuses on building and reflecting of social associations among users. These associations may be stored within a social graph at each social networking service (e.g., maintained at remote server(s) 120). Such user associations may be defined on a user-to-user basis, or as a group of users associated through membership within a group. As used herein, "contacts" refer to other users that a user is associated with, at one or more social networking services. As used herein, an "item" generally refers to an item or document shared by one user ("item owner") with one or more other users of the social networking service. An item may include original content as well as preexisting content shared by the item owner. The item content may include text, images, video, audio, links, files, and/or other media. As used herein, "user," refers to a user, group, organization or other individual or collection of individuals, owning, operating, taking actions toward or otherwise participating in a social networking service or item generation, viewing, control, etc.

A user may create "social groups" (e.g., social circles) including one or more contacts to organize his/her associations. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

FIG. 1 illustrates an example client-server network environment, which provides for generating a query-based social stream for a user of a social networking service. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate for generating a query-based social stream for a user interacting with electronic devices 102, 104, 106. Server 110 may further be in communication with remote servers 120 either through the network 108 or through another network or communication means.

According to some aspects, remote servers 120 can be any system or device having a processor, a memory and communications capability for hosting various search engines and social networking services. Server 110 and one or more remote servers 120 may be further capable of maintaining social graphs of users and their contacts. The social networking service hosted on the server 110 or one or more remote servers 120 may enable users to create a profile and associate themselves with other users at a social networking service. The server 110 and/or remote servers 120 may further facilitate the generation and maintenance of a social graph including the user created associations. The social graphs may include, for example, a list of all users of the social networking service and their associations with other users of the social networking service.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106 may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, Wifi, or other such transceiver.

Users may interact with the system (e.g., a social networking service) hosted by server 110 through a client application installed at the electronic devices 102, 104, 106. Alternatively, the user may interact with the system and the one or more social networking services through a web based browser application at the electronic devices 102, 104, 106. Communication between client devices 102, 104, 106 and the social networking service may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
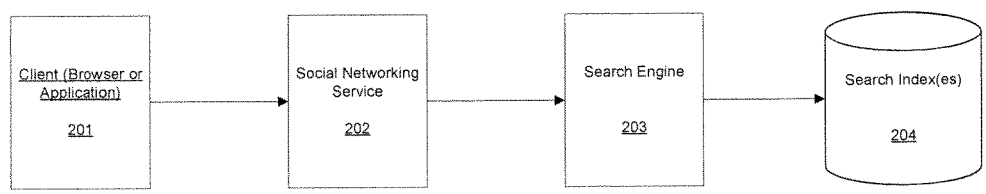
FIG. 2 illustrates a system diagram of an example system for generating a query-based social stream for a user of a social networking service.

FIG. 2 illustrates a system diagram of an example system 200 for generating a query-based social stream for a user of a social networking service. The system includes a client application 201, a social networking service 202 (e.g., hosted at server 110), a search engine 203 (e.g., hosted at a remote server 120) and one or more search index 204 (e.g., stored at one or more data stores communicably coupled to server 110 and/or remote server 120).

The client application 201 is communicably coupled to social networking service 202 and may be implemented in a browser or application at a client device (e.g., client devices 102, 104, 106). The user may access the social networking service through the client application. The social networking service 202 generates one or more graphical user interfaces including various social data and provides the social data for display within the graphical user interfaces at the client application. The social data may include a social stream, including one or more items, generated for display to the user according to the query-based model described herein.

The social networking service 202 is communicably coupled to search engine 203 and may send a query to the search engine 203. The search engine 203 is communicably coupled to the search index 204 and accesses the storage storing the search index to retrieve items matching the query sent from the social networking service 202. The items retrieved as a result of the query, which may be sorted according to various criteria and techniques, are forwarded to the social networking service 202 from the search engine 203 in response to the query.

Social networking service 202 provides the one or more items (e.g., according to the sorting) for display to the user at client application 201. In addition, social networking service 202 may receive indication of items being generated by a user at a client application 201 at a client device (e.g., client devices 102, 104, 106) and may process and provide the item for storage at search index 204. In another example the generated items, including newly generated items and/or updates to existing items, may be processed by an intermediary application and stored at a search index 204.

Figure 3:
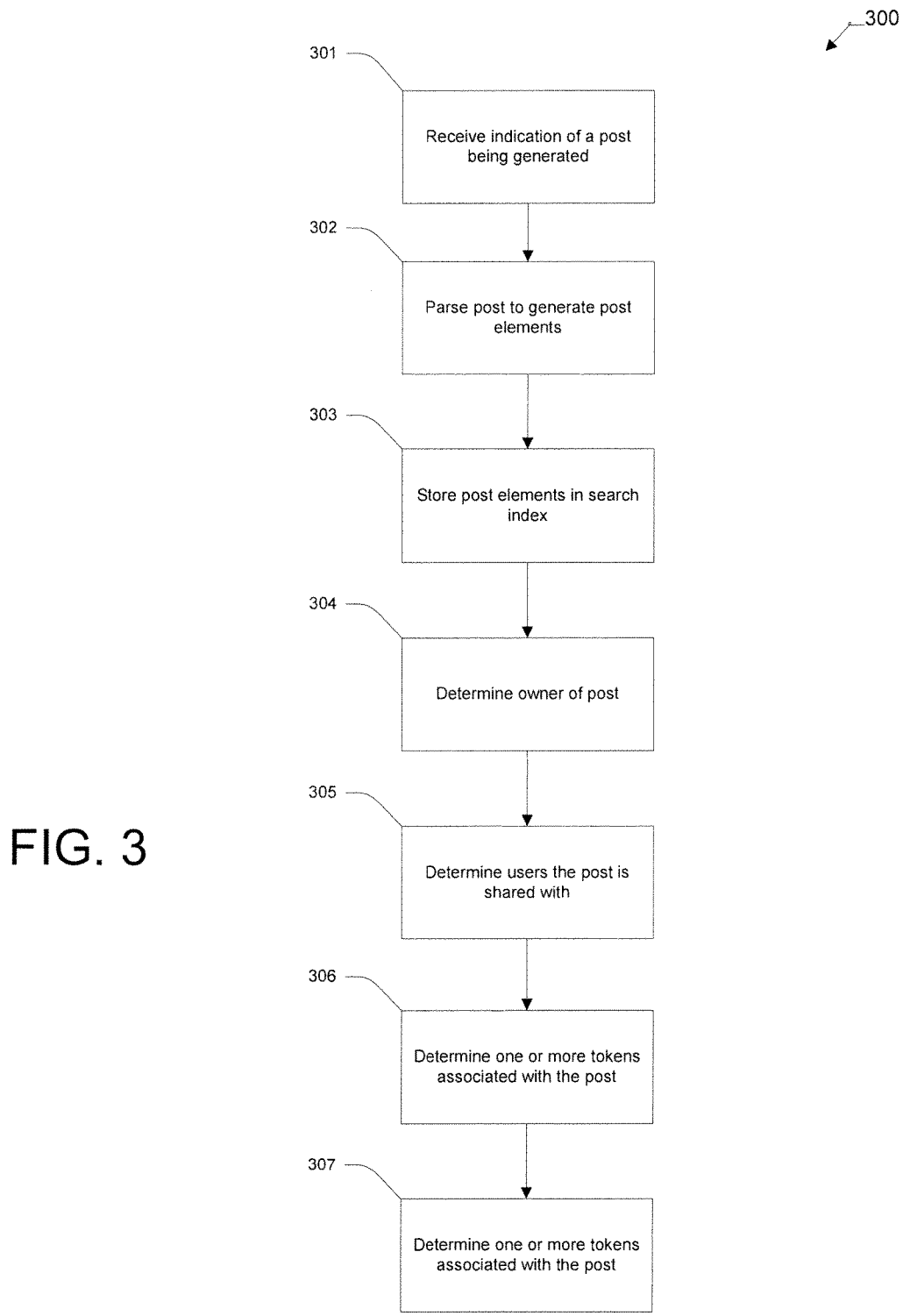
FIG. 3 illustrates a flow diagram of an example process for storing of items at a search index to facilitate a query-based social stream.

FIG. 3 illustrates a flow diagram of an example process 300 for storing of items at a search index to facilitate a query-based social stream. In step 301, the system receives an indication of an item being generated. In one example, the indication may be received when a user of the social networking service creates a new item. In another example, the indication may also be received for updates to items (e.g., updates to content, users the item is shared with, etc.). In step 302, the system parses the item content to generate one or more item elements. The system may, for example, parse the item and extract one or more item related elements including item content, item title and/or item topic(s).

In step 303, the system stores the item elements within a search index. In one example, the system maintains a first search index for those items identified as private items, and another search index for public items. Based on whether an item is identified as public or private the item is stored in the correct index. The item elements may include the item content, item title and/or topic indicators (e.g., topic tags). In one example, with respect to certain items (e.g., private items) the items are encrypted before being stored within the search index and can be decrypted using a key. In one example, the key to decrypt the item content is accessible according to the end user credentials of a user authorized to view the item.

In step 304, the system determines the item owner for the item (e.g., the item author or user who requested to generate the item). In step 305, the system determines the users the item is shared with. In one example, either during step 305, or at some other point in process 300, the system determines additional information regarding the item including whether the item is public or private (e.g., shared with all users, or a specific group of users) and/or whether the item is by a super followee (e.g., a user with a large number of followers).

In step 306, based on the determinations in step 304 and 305, the system identifies one or more tokens associated with the item. The tokens may include one or more ID-based tokens and/or other tokens. The ID-based tokens include user tokens (also referred to as "searcher tokens") representing one or more of the users with whom the item is shared or to whom the item is visible (e.g., contacts or followers of the item owner). The number of user tokens stored along with the item may depend on the threshold number of tokens that can be stored. Where the number of users that the item is shared with exceeds the threshold number (e.g., of all tokens or allowed number of user tokens), the system may determine that the item owner is a super followee. In one example, a second ID-based token, known as an owner token, identifying the owner of the item, is stored along with the item. In addition to the owner token, where the system determines that the owner of the item is a super followee (e.g., based on the number of user tokens or based on information regarding the owner), the system may further store a non-ID-based token ("super doc token") along with the item, indicating that the item is owned by a super followee. An example process for identifying tokens associated with an item is described in more detail below with respect to FIG. 4.

In step 307, the one or more tokens are stored in association with the item. In one embodiment, the one or more tokens are stored in association with the item within the search index. In another example, one or more of the tokens may be stored at a separate storage and a link to the storage may be associated with the item. The number of tokens associated with the item may be limited to a certain threshold number (e.g., for various reasons including efficiency).

Figure 4:
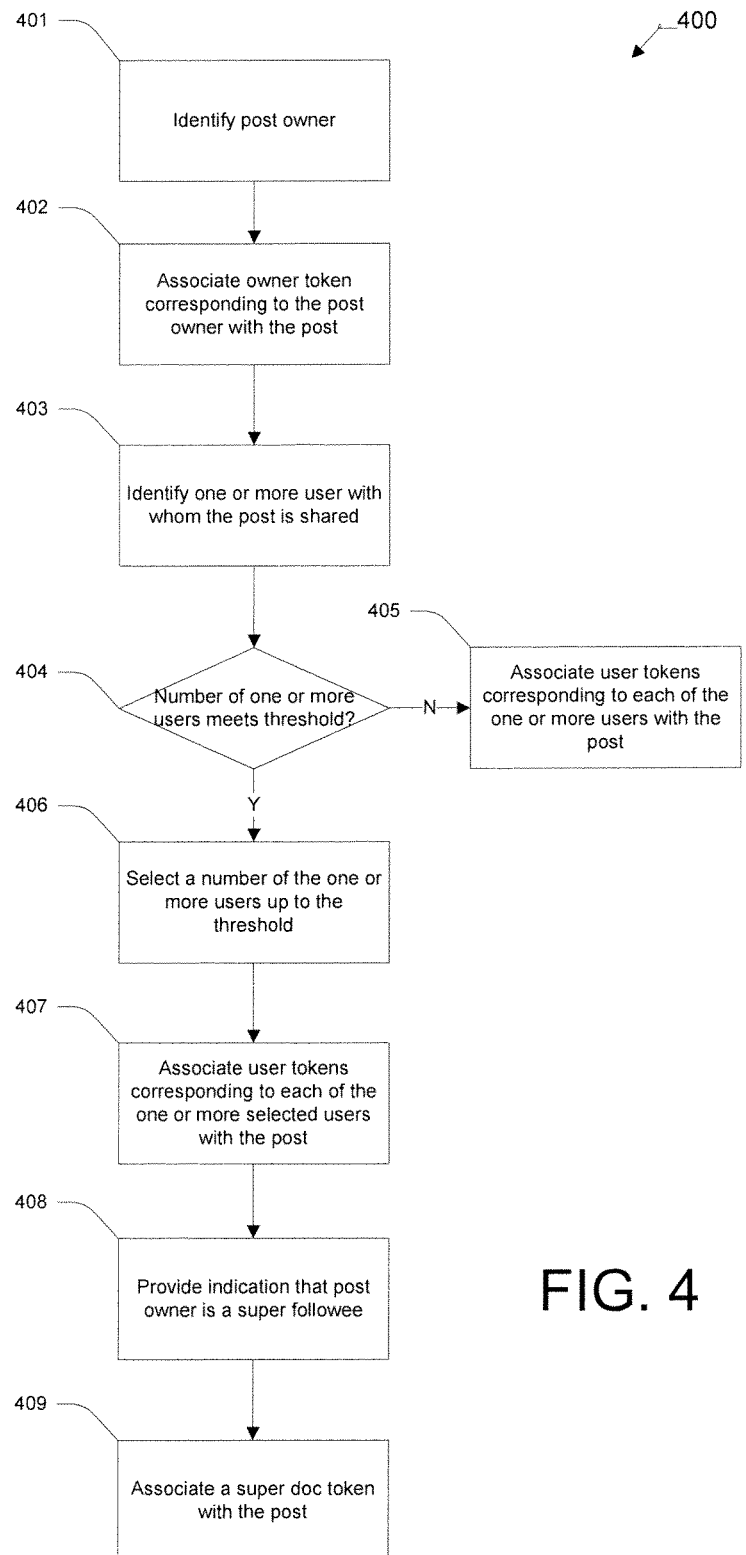
FIG. 4 illustrates a flow diagram of an example process for identifying tokens associated with an item generated by a user of a social networking service.

FIG. 4 illustrates a flow diagram of an example process 400 for identifying tokens associated with an item generated by a user of a social networking service. In step 401, the system identifies the item owner associated with the item. In one example, the item owner is the user that generated the item. In step 402, the system identifies an owner token corresponding to the item owner and associates the token with the item. That is, in one example, during step 402, an ID-based token, known as an owner token, identifying the owner of the item, in association with the item.

In step 403, the system identifies one or more users with whom the item is shared. In one example, the item owner may select one or more users of the social networking service or at least one social group including one or more users and/or groups (e.g., contacts of the power owner) and may select to make the item visible to the selected users. In another example, the item may be shared with all users associated with the item owner (e.g., all contacts of the item owner). In yet another example, the system may identify one or more specific users or social groups based on various criteria (e.g., user settings, user preferences, user history), and may suggest the users to the owner for selection or automatically share the item with the identified users or social group(s).

In step 404, the system determines if the number of users identified in step 403 meets a threshold. The number of users and/or user tokens associated with an item may be limited to a threshold number for various reasons (e.g., efficiency). The number of user tokens stored along with the item may depend on the threshold number of tokens and/or user tokens that can be stored. In one example, the threshold value(s) may be pre-stored and may be retrieved before or during step 404. If, in step 404, it is determined that the number of users that the item is shared with meets the threshold (e.g., exceeds a threshold number of all tokens or allowed number of user tokens), the system continues to step 406. Otherwise, in step 405, the system identifies one or more user tokens corresponding to each of the one or more users identified in step 403 associated with the item. The ID-based user tokens (also referred to as "searcher tokens") identify each user with whom the item is shared or to whom the item is visible (e.g., contacts or followers of the item owner).

In step 406, the system selects a number of the one or more identified users up to the threshold number. The selection may be performed in a random manner and/or the system may select the top users (e.g., those users having higher affinity with respect to the user). In step 407, the system identifies user tokens for the selected one or more users associated with the item for storing along with the item.

Additionally, if it is determined that the number of users that the item is shared with meets the threshold, the system may determine that the item owner is a super followee. In such instance, in step 407, the system provides indication that the item owner is a super followee. In one example, the indication may include a tag or other identifier being stored in association with the item owner and/or one or more contacts of the item owner (e.g., within the item owner profile, and/or the social graph maintaining associations between the item owner and his/her contacts at the social networking service).

In addition, when the system determines, in step 404, that the number of users that the item is shared with (e.g., visible to) meets the threshold, in step 409, the system may further associate a non-ID-based token ("super doc token") with the item, indicating that the item is owned by a super followee. The retrieval tokens stored along with the item facilitate easy retrieval of items at the time of retrieval for display to the user using the retrieval tokens associated with each item stored in the search index.

Figure 5:
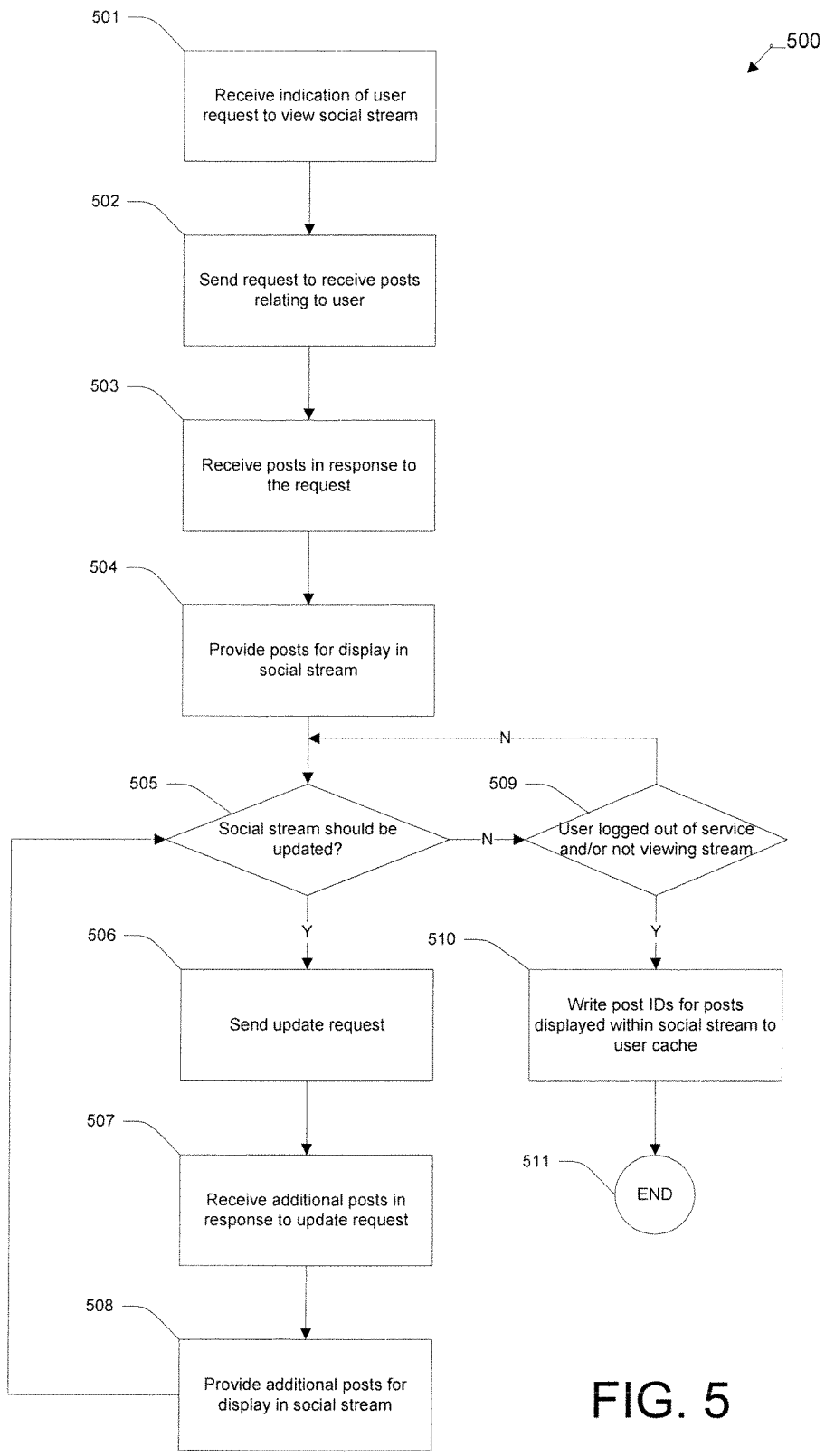
FIG. 5 illustrates a flow diagram of an example process for providing a user of a social networking service with a social stream of items according to a query-based model.

FIG. 5 illustrates a flow diagram of an example process 500 for providing a user of a social networking service with a social stream of items according to a query-based model. In one example, the process 500 may be performed at the social networking service 202. In other example, one or more other system elements (e.g., system components of FIG. 2) may perform one or more steps of the process in addition to or in lieu of the social networking service 202. In some examples, the steps and processes described herein may be performed by one or more other elements and/or system in lieu of or in combination with the system 200 and/or one or more elements of the system.

In step 501, the system receives an indication of user request to view one or more items (e.g., within his/her social stream at a social networking service). In one example, the indication is received in response to a user logging onto a social networking service, clicking on his/her profile page, or otherwise taking an action that causes the social networking system to recognize that a social stream should be displayed to the user.

In step 502, a query is generated and sent to a backend search engine. The backend search engine has access to the one or more search indexes storing items generated by users of the social networking service. The query may include information regarding the user, the user's friends and/or the users/entities that the user is following. The information regarding the user includes end user credentials of the user (e.g., SID cookie of the user) for accessing items (e.g., the ender user credential is used to decrypt encrypted items). The information regarding the user may also include various other information including user preferences, user settings, and other similar information that may be helpful in retrieving items for display to the user.

In one example, the query further includes one or more tokens. In some implementations, in step 502, the system identifies one or more tokens. The tokens may include a user token associated with the user, one or more owner tokens associated with one or more of the user's contacts (e.g., fresh contacts and or super followees) and/or a super doc token. The process for identifying one or more tokens for generating a query to retrieve items for display in a social stream is described in more detail below with respect to FIG. 7.

In step 503, the system receives one or more items in response to the query. In step 504, the one or more items are provided for display to the user in a social stream. In one example, all retrieved items may be provided for display to the user. In another example, a specific number of items (e.g., highest ranked items) are selected and provided for display to the user. In one example the items are displayed to the user according to the sorting. Once the initial list or stream of items is provided for display to the user in response to the query, the system may update the list of items as new items are generated. An example process for providing one or more items for display to the user in response to a query is described in more detail below with respect to FIG. 6.

In one example, in step 505, the system determines whether the social stream displayed to the user should be updated. In one example, updates may be periodic, such that the system determines that an update is necessary when a specific amount of time has lapsed. Similarly, the system may determine an update is necessary when a user manually requests an update (e.g., by pressing the refresh button).

If, in step 505, the system determines that the social stream should be updated the system continues to step 506. In step 506, the system generates an update request. The update request includes an update query sent to the backend search engine to retrieve new items stored at the index since the time the original items were provided for display and/or since the last update. The query may include all or some of the information included within the original query and may further include a time restriction, indicating the time of the last update. In one example the system updates the list of items by storing a binary large object (blob) at the browser for issuing further queries. The blob includes the one or more tokens, user information, affinity information and/or contact information included within the original query, as well as a time element which reflects the time at which the original list of items was generated and/or provided for display to the user, or the last time the list was updated with new items. In one example, the update request is generated using the information stored in the blob.

In step 506, an update request is sent to the backend search engine. In one example, the update request is an additional query for additional items. In step 507, one or more items are retrieved in response to the query. In step 508, one or more additional items are provided for display to the user (e.g., at the top of the social stream). An example process for providing one or more items for display to the user in response to a query is described in more details below with respect to FIG. 6. In this manner, the items presented for display to the user remains up to date for the duration that the user is viewing the stream and/or logged into the social networking service.

If in step 505, the system determines that the social stream should not be updated, in step 509, the system determines if the user has logged out of the service or otherwise is no longer viewing the social stream. If so, in step 510, the system writes item IDs for all items displayed within the social stream of the user within a user cache, and the process ends in step 511. Otherwise, if in step 509, the system determines that the user has not logged out of the service and/or is still viewing the social stream, the process returns to step 505.

Figure 6:
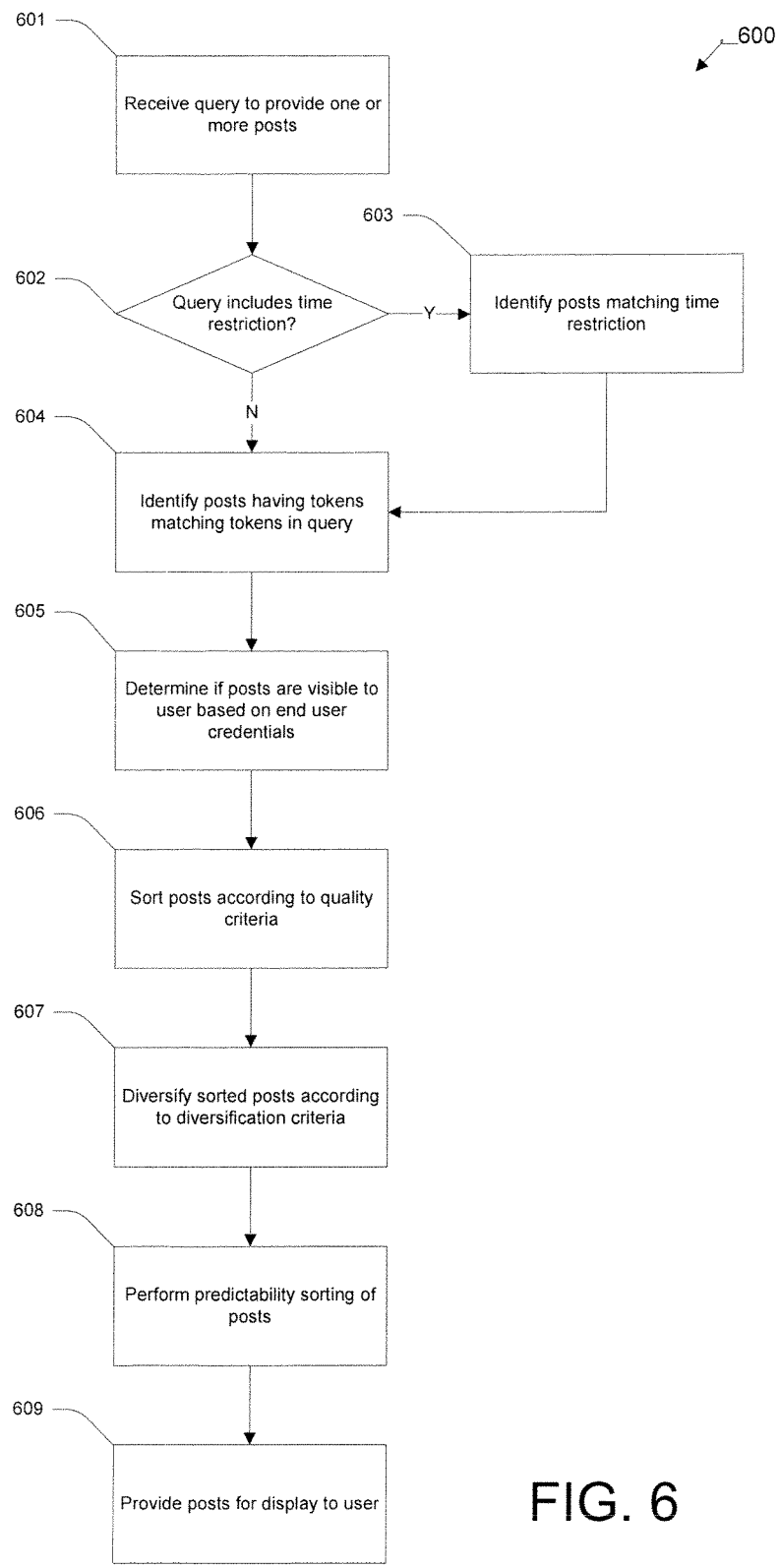
FIG. 6 illustrates a flow diagram of an example process for providing one or more items for display to the user in response to a query.

FIG. 6 illustrates a flow diagram of an example process 600 for providing one or more items for display to the user in response to a query. In one example, the process 600 may be performed at search engine 203. In other example, one or more other system elements (e.g., system components of FIG. 2) may perform one or more steps of the process in addition to or in lieu of the search engine. For example, in one embodiment, a separate element or the social networking service 202 may perform one or more of the steps 605-609 after being provided with the items identified in steps 603 and 604. In some examples, the steps and processes described herein may be performed by one or more other elements and/or system in lieu of or in combination with the system 200 and/or one or more elements of the system.

In step 601, a query to provide one or more items associated with the user is received (e.g., at the search engine 203). The query may include a query or update query generated as described above with respect to process 500 of FIG. 5.

In step 602, the query is processed to determine if the query includes a time restriction. As described above, in one example, an update query includes a time restriction indicating the time at which the last update to the social stream was performed, such that recent items generated and/or updated since the last update are retrieved and provided for display within the social stream. In one example, similar to update queries, the original query may similarly include a time element t, showing the last time a stream of items was displayed to the user. As described above, a user cache may be maintained for a user with item IDs of items previously presented to the user. The system may take advantage of the cache and only request items generated, updated and/or stored after the time of the last update to the cache. In one example, the items with item IDs within the cache are then retrieved and presented along with items provided in response to the query. In on example, the time element t may only be included for queries issued where the user has logged into the service within a specific period of time such that information regarding previously presented items are available (e.g., before the cache is cleared).

If, in step 602, the system (e.g., at the search engine) determines that a time restriction exists, the process continues to step 603. In step 603, the system identifies items within the search index meeting the time restriction. As described above, the time restriction may consist of a time t representing the last time that the items within the social stream were updated and/or retrieved. In one example, each item entry in the search index includes a time stamp showing the time that the item was generated and/or stored. In step 603, the system identifies all items generated and/or stored in the search index having a time stamp that is newer than the time t.

After performing the identification in step 603, or when there is no time restriction associated with the query, the process continues to step 604. In step 604, the system identifies items matching the tokens included within the query. That is the system searches for items including a token matching at least one token included within the query (e.g., a user token, an owner token or a super doc token with filter restrictions). Where a time restriction exists, the candidate items are those items identified in step 603. Otherwise all items stored within the search index are candidates for the search. In one example, the system identifies items authored by contacts of the user (e.g., according to a list of contacts provided with the query) including entities the user is following (e.g., according to the list of entities provided with the query). The items identified in step 604 include items visible to the user including private items visible to the user and/or public items that are owned by contacts of the user.

The system, for example, identifies each item including a user token of the user, as well as items including an owner token matching those included in the query (e.g., owner tokens of fresh contacts and/or super followees). In addition, where the query includes a super doc token, the system identifies items having a super doc token matching the filter criteria included in the query. Thus, an item having a super doc token is retrieved if it meets the filter criteria included in the query (e.g., is owned by a super followee that the user is following).

In step 605, for each item, the system determines if the item is visible to the user. In one example, the system determines if the end user credentials of the user (e.g., included within the query) decrypt any private encrypted item and/or if the item is public. This is a precautionary measure taken such that privacy changes with respect to an item may be kept up to date.

In step 606, the system sorts the retrieved items according to several quality criteria including the popularity of each item, the affinity of the user to the author of each item and the freshness of each item. In one instance, the search engine calculates a quality score for each item based on the sorting criteria, and the items are sorted according to the quality score for each item.

In one example, because sorting with quality may result in a non-chronological sorting of the items, the system may determine if the ordering of items as sorted according to the quality criteria is not in balance with the chronological ordering of the items and may reorder the items to restore the chronological ordering of the items. In one example, a score threshold and time threshold is determined. Where two items do not meet the time and/or score threshold (e.g., not close in time and/or score), the ordering of the items based on their quality score is preserved. However, where two items do meet the score and time threshold (e.g., the difference in score of the two items is smaller than the threshold and they are close enough in time), the items are reordered according to their chronological order.

After the retrieved items have been sorted, in step 607, the search engine may diversify the sorted items according to one or more diversification criteria. Diversification is a process for ensuring that too many items having the same features (e.g., same author, same topic, same medium type, same group of users, etc.) are not presented to the user in one batch or at the top of the list. Various methods may be employed to diversify the items. As a result of diversification the items are resorted to provide a more diversified ordering of items.

In one example, in step 608, the search engine performs predictability sorting of the items where the items may be reordered to maintain predictability for the user. As streams are presented to the user and a user views an item, the system keeps track of those items already viewed by the user. In one example, a user cache is maintained with item identifiers (ID) for each item seen by the user. Additionally, the system may detect when the user has actually viewed and/or read an item provided to the user (e.g., through detecting user scrolling, time spent on a page, clicking on an item, performing an action with respect to the item or other techniques for detecting and/or approximating user viewing and/or reading an item). The information regarding whether the user read/viewed the item may be stored within the user cache. In another example, only identifier of items viewed and/or read by the user are stored within the cache. In one example, the user cache is maintained for a short period of time (e.g., one or two weeks) before it is cleared. This ensure that the small amount of memory taken up by the item IDs stored within the cache is not wasted if the user is inactive for a long period of time such that the predictability provided through this technique is not beneficial or noticeable to the user.

In step 608, the system may access the user cache storing information regarding items previously presented to the user and/or viewed/read by the user. The items having been previously presented to the user, viewed by the user and/or read by the user may then be pushed down on the stream. This provides the user with some predictability as the user is likely to recognize that he/she has reached a location within the list of items that include items previously presented to the user. In this way, items not previously provided for display to the user, and/or viewed by the user, are likely to be presented on top of the list such that the user is likely to pay closer attention to these items.

Once the sorting according to the various methods described above is completed, in step 609, one or more items are selected and provided for display to the user. In one example, all retrieved items may be provided for display to the user. In another example, a specific number of items (e.g., highest ranked items) are selected and provided for display to the user. In one example the items are displayed to the user according to the sorting.

Figure 7:
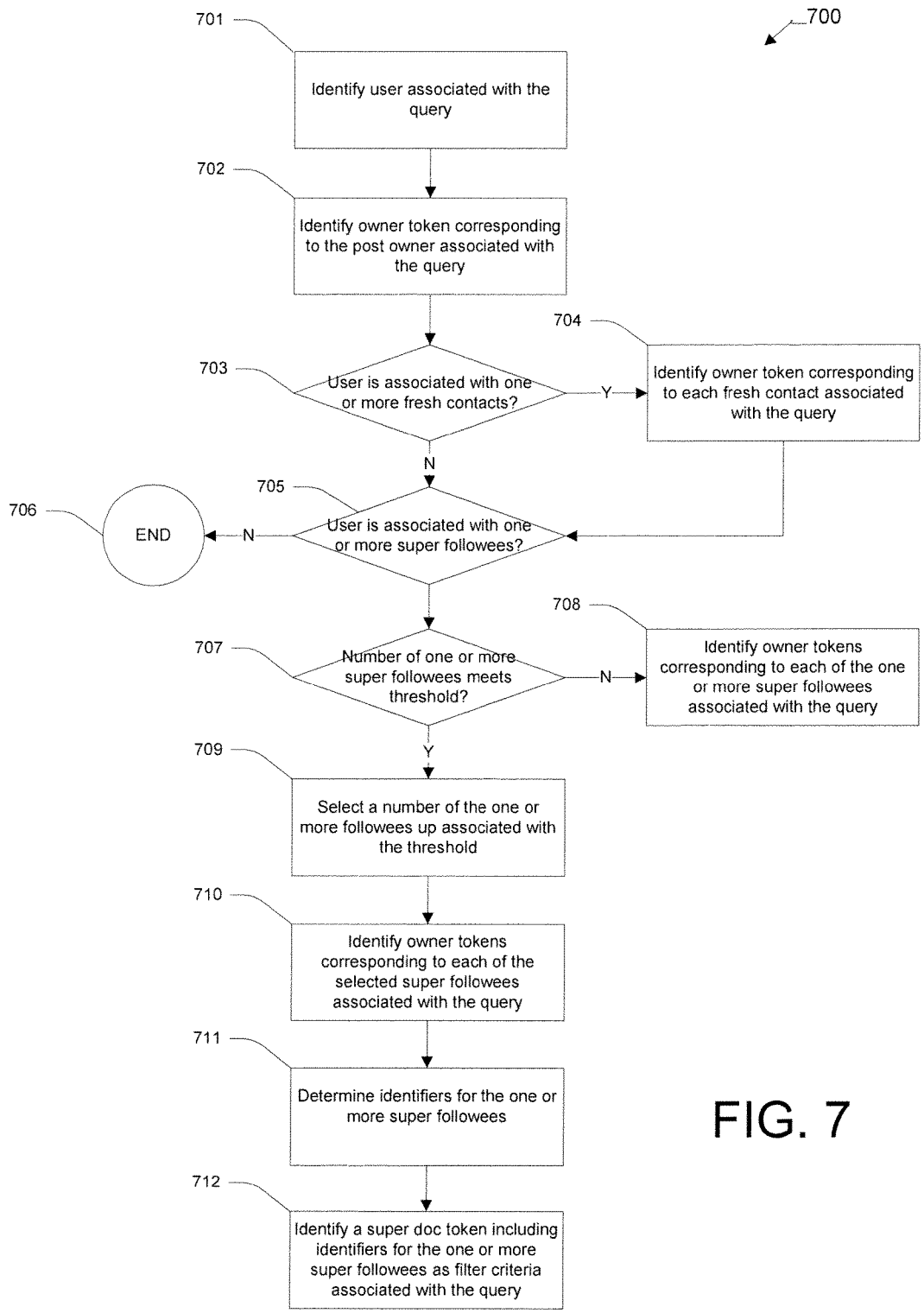
FIG. 7 illustrates a flow diagram of an example process for identifying one or more tokens to include in a query to retrieve items for display within a social stream associated with a user.

FIG. 7 illustrates a flow diagram of an example process 700 for identifying one or more tokens to include in a query to retrieve items for display within a social stream associated with a user. In step 701, the system identifies the user associated with the query. In step 702, the system adds a user token corresponding to the user to the query. In step 703, the system determines if the user is associated with one or more fresh contacts. Fresh contacts are determined as those contacts that have been associated with the user within a pre-defined amount of time (e.g., 10 days). In one example, in step 703, the system identifies the contacts associated with the user at the social networking service and determines if one or more of the contacts are fresh contacts. If, in step 703, the system determines that the user is associated with one or more fresh contacts, in step 704, an owner token associated with each of the fresh contacts is identified and added to the query.

In step 705, the system determines if the user is associated with one or more super followees. In one example, the determination in step 705 may be performed before or simultaneously with step 703, or after step 703, if the user does not have any fresh contacts, or after an owner token associated with each fresh contact is added to the query in step 704. As described above, a user is identified as a super followee if the user generates an item that is shared with and/or visible to a large number of users (e.g., a number of users meeting/exceeding a threshold indicating that the item owner has a large number of followers/contacts). Where a user of the social networking system is identified to be a super followee (e.g., where the user has one or more items with such characteristics as describe above), the system may store an indicator of the user being a super followee. In step 704, the system may identify all contacts associated with the user and may determine if any of those contacts has been identified as a super followee. If, in step 705, the system determines that the user is not associated with any super followees, the process ends and the query may be sent including the user token and/or one or more owner tokens associated with the query.

Otherwise, in step 707, the system determines if the number of super followees meets a threshold value. The number of tokens (and/or owner tokens) included within the query may be limited to a threshold number, for various reasons including efficiency. Thus, the threshold may be the number of owner tokens or tokens allowed within the query minus the number of fresh contacts associated with the user. For example, if the number of super followees exceeds a threshold number (e.g., the user is following a large number of super followees and/or has a large number of recent friends), the system determines that the threshold is met in step 707.

If the threshold is not met by the number of super followees associated with the user, in step 708 the system adds owner tokens associated with each of the super followees associated with the user to the query. Otherwise, in step 709, the system selects a number of the one or more super followees up to a threshold (e.g., same as the above threshold, or up to a number allowing for an additional token). The selection may be performed in a random manner and/or the system may select the top super followees (e.g., those super followees having higher affinity with respect to the user).

In step 710, the system adds owner tokens associated with the selected one or more super followees to the query.

Additionally, where in step 707 it is determined that the number of super followees, owner tokens and/or total number of tokens included within the query meets/exceeds one or more thresholds (e.g., the user is following a large number of super followees and/or has a large number of recent friends) a super doc token may be further included within the query.

Thus, in step 711 the system determines identifiers for the one or more super followees associated with the user (and/or not otherwise included in the query). In step 712, the system associates the super doc token including the identifiers for the one or more super followees, as identified in step 711, as filter criteria associated with the super doc token, to the query.

The super doc token, as described above, is appended to all items owned by a super followee, at the time of storage. Thus, the super doc token will match all items owned by a super followee. To customize the super doc token to return items associated with the super followees followed by the user, a super doc token is associated with a set of filter criteria. The filter criteria consist of the identifiers for the super followees associated with the user. In another example, the filter criteria may consists of identifiers for only those super followees for whom the owner token is not included within the query in step 710.

The systems and processes described here are described with respect to items being generated, stored and/or provided for displayed within a social networking service for exemplary purposes. Same or similar systems and processes may be used with respect to one or more other items and/or one or more other services, systems and or infrastructures to provide similar advantages to users. The item may include various multi-media content including text, images, audio, video, a link, a digital file, a document and other various items. For example, in one example, the systems and processes described above may be used in a search environment for providing a user with search results (e.g., one or more items), for example, in response to a search query.

In situations in which the system and processes discussed here collect or make use of personal information about users, the users may be provided with an opportunity to control whether and/or to what extent the programs or features collect and make use of such user information (e.g., information about user social network, contacts, user preferences, historical activity, profile information), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In addition, where information regarding content generated by the user is stored and/or shared with one or more other users, various privacy controls may be employed to facilitate protecting the storing and/or sharing of such content to the extent that the content includes personal data or to the extent that the user has selected to limit the visibility of the data to one or more other users.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 8:
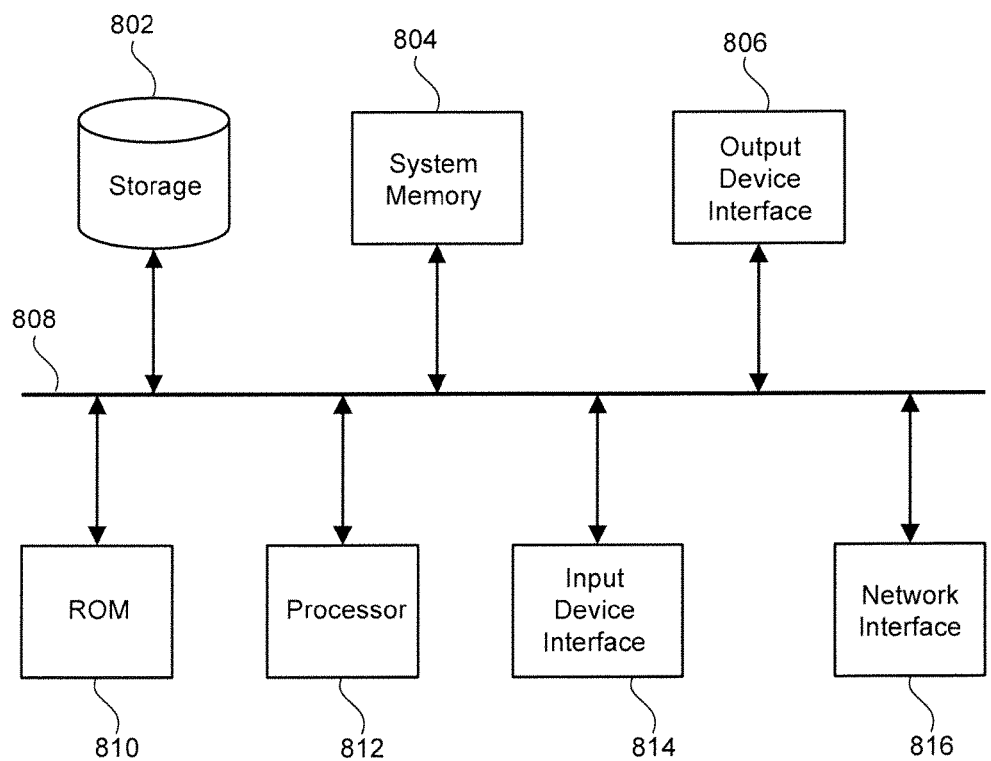
FIG. 8 conceptually illustrates an electronic system with which some implementations of the subject technology are implemented.

FIG. 8 conceptually illustrates an electronic system with which some implementations of the subject technology are implemented. Electronic system 800 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 800 includes a bus 808, processing unit(s) 812, a system memory 804, a read-only memory (ROM) 810, a permanent storage device 802, an input device interface 814, an output device interface 806, and a network interface 816.

Bus 808 collectively represents all system, peripheral, and chipset buses that communicatively connect the numerous internal devices of electronic system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of the electronic system. Permanent storage device 802, on the other hand, is a read-and-write memory device. This device is a non-volatile memory unit that stores instructions and data even when electronic system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. For example, the various memory units include instructions for generating a query-based social stream. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to the electronic system. Input devices used with input device interface 814 include, for example, alphanumeric keyboards and pointing devices (also called "cursor control devices"). Output device interfaces 806 enables, for example, the display of images generated by the electronic system 800. Output devices used with output device interface 806 include, for example, printers and display devices, such as cathode ray tubes (CRT) or liquid crystal displays (LCD). Some implementations include devices such as a touchscreen that functions as both input and output devices.

Finally, as shown in FIG. 8, bus 808 also couples electronic system 800 to a network (not shown) through a network interface 816. In this manner, the computer can be a part of a network of computers (such as a local area network ("LAN"), a wide area network ("WAN"), or an Intranet, or a network of networks, such as the Internet. Any or all components of electronic system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A machine-implemented method, comprising:
   receiving an indication of a request from a user to view a stream associated with the user;
   generating a request for one or more items, of a plurality of items, that are visible to the user for display within the stream, wherein each of the plurality of items includes one or more user tokens up to a threshold number of user tokens, the one or more user tokens indicate viewability of the item by users associated with the one or more user tokens, wherein the request comprises a search query identifying search criteria including one or more tokens up to a threshold number of tokens, the one or more tokens includes at least a user token identifying the user, and wherein generating the request comprises:
determining that a super followee token is to be included in the search query, the super followee token corresponding to a super followee user that owns an item visible to a number of users that meets a threshold number of users,
replacing the super followee token with a super doc token when the included super followee token causes the one or more tokens to exceed the threshold number of tokens, the super doc token identifying a type of item owned by the super followee user;
receiving one or more items in response to the request, the one or more items including at least one of the one or more tokens and further being visible to the user; and
providing the one or more items for display to the user within the stream in response to the request.

2. The method of claim 1, further comprising:
determining that the stream should be updated; and
sending an update request comprising an update search query, the update search query including the search criteria of the search query and further comprising a time restriction, wherein the time restriction indicates one of a time when the one or more items were received in response to the search request or a time when one or more items were received in response to an update search query;
receiving one or more additional items in response to the update search request; and
providing the one or more additional items for display within the stream in addition to the one or more items.

3. The method of claim 1, the one or more tokens further including at least one owner token, the owner token identifying a second user associated with the first user.

4. The method of claim 1, wherein the super doc token is associated with a set of filter criteria.

5. The method of claim 1, further comprising:
determining that the user is no longer viewing the stream and storing identifiers of the items displayed within the stream within a list of items.

6. The method of claim 1, further comprising:
identifying the one or more items from the plurality of items, the plurality of items comprising items generated by one or more users and wherein each of the plurality of items is associated with one or more tokens including the one or more user tokens.

7. The method of claim 6, the identifying comprising:
identifying a set of items of the plurality of items having tokens matching at least one of the one or more tokens, the set of items including one or more items; and
determining that the one or more items of the set of items are visible to the user.

8. The method of claim 6, further comprising:
sorting the one or more items; and
providing the one or more items according to the sorting.

9. The method of claim 8, wherein the sorting comprises:
determining a quality score for each of the one or more items, the quality score being based on quality criteria, wherein the quality criteria includes item popularity, item freshness, and affinity of the user and an owner of the item; and
sorting the one or more items according to a quality score associated with each of the one or more items.

10. The method of claim 8, wherein the sorting comprises:
diversifying the one or more items according to one or more diversification criteria.

11. The method of claim 8, wherein the sorting comprises:
identifying a list of items previously displayed to a user in a stream, the list comprising identifiers for each of one or more previously displayed items;
identifying the one or more of the one or more items that have identifiers listed in the list of items; and
moving the identified one or more of the one or more items below the one or more items, such that the one or more of the one or more items are sorted further from a top with respect to the other items of the one or more items.

12. The method of claim 1, wherein the query further includes end user credentials associated with the user and wherein an item is visible to the user if the item can be decrypted using end user credentials associated with the user.

13. A system comprising:
one or more processors; and
a machine-readable medium comprising instructions stored therein, which when executed by the processors, cause the processors to perform operations comprising:
receiving a query to provide one or more items, of a plurality of items, for display to a user within a stream, the query identifying search criteria including one or more tokens up to a threshold number of tokens, the one or more tokens including at least a user token identifying the user,
wherein the one or more tokens include a super doc token identifying a type of item owned by a super followee user, the super doc token replaced a super followee token corresponding to the super followee user, the super followee user owns an item visible to a number of users that meets a threshold number of users;
identifying a set of items including one or more items from the plurality of items having tokens matching at least one of the one or more tokens, the plurality of items comprising items generated by one or more users and wherein each of the plurality of items includes one or more tokens including one or more user tokens up to a threshold number of user tokens, the one or more user tokens indicating viewability of the item by users associated with the one or more user tokens;
determining one or more items of the set of items visible to the user, wherein an item is determined to be visible to a user when the user is authorized to view the item;
sorting the one or more items; and
providing the one or more items according to the sorting in response to the query.

14. The system of claim 13, wherein the query further includes end user credentials associated with the user and wherein a user is authorized to view the item if the item can be decrypted using end user credentials associated with the user.

15. The system of claim 13, wherein the sorting comprises:

determining a quality score for each of the one or more items, the quality score being based on quality criteria, wherein the quality criteria includes one or more of item popularity, item freshness, and affinity of the user and an owner of the item; and sorting the one or more items according to the quality score associated with each of the one or more items.

16. The system of claim 13, wherein the sorting comprises:

diversifying the one or more items according to one or more diversification criteria.

17. The system of claim 13, wherein the sorting comprises:

identifying a list of items previously displayed to a user in a stream, the list comprising identifiers for each of one or more previously displayed items;

identifying the one or more of the one or more items that have identifiers listed in the list of items; and moving the identified one or more of the one or more items below the one or more items, such that the one or more of the one or more items are sorted further from a top with respect to other items of the one or more items.

18. The system of claim 13, wherein the one or more tokens comprise one or more of a user token identifying the user or an owner token identifying an owner of an item.

19. The system of claim 13, wherein the super doc token is associated with one or more filter criteria, wherein the identifying a set of items including one or more items from a plurality of items comprises identifying items that include a second super doc token and further match the filter criteria.

20. A non-transitory machine-readable medium comprising instructions stored therein, which when executed by a machine, cause the machine to perform operations comprising:

receiving an indication of a request from a requesting user to view a stream associated with the requesting user;

generating a query corresponding to the request; determining one or more tokens, up to a threshold number of tokens, to include in the generated query, wherein determining the one or more tokens comprises:

determining that a super followee token is to be included, the super followee token corresponding to a super followee user that owns an item visible to a number of users that meets a threshold number of users;

replacing the super followee token with a super doc token when the included super followee token causes the one or more tokens to exceed the threshold number of tokens, the super doc token identifying a type of item owned by the super followee user; identifying, in response to the query, a set of items including one or more items from a plurality of items having tokens matching at least one of the one or more tokens, the plurality of items comprising items generated by one or more users and wherein each of the plurality of items is associated with at least one user token, up to a threshold number of user tokens, which indicates viewability of the item by a user associated with the at least one user token;

determining one or more items of the set of items visible to the requesting user, wherein an item is determined to be visible to a user when the user is authorized to view the item; and providing the one or more items of the set of items for display to the requesting user in response to the request.

* * * * *